Aug. 3, 1937.  T. W. LOFTIS  2,089,064
WAVE MOTOR
Filed Nov. 2, 1935
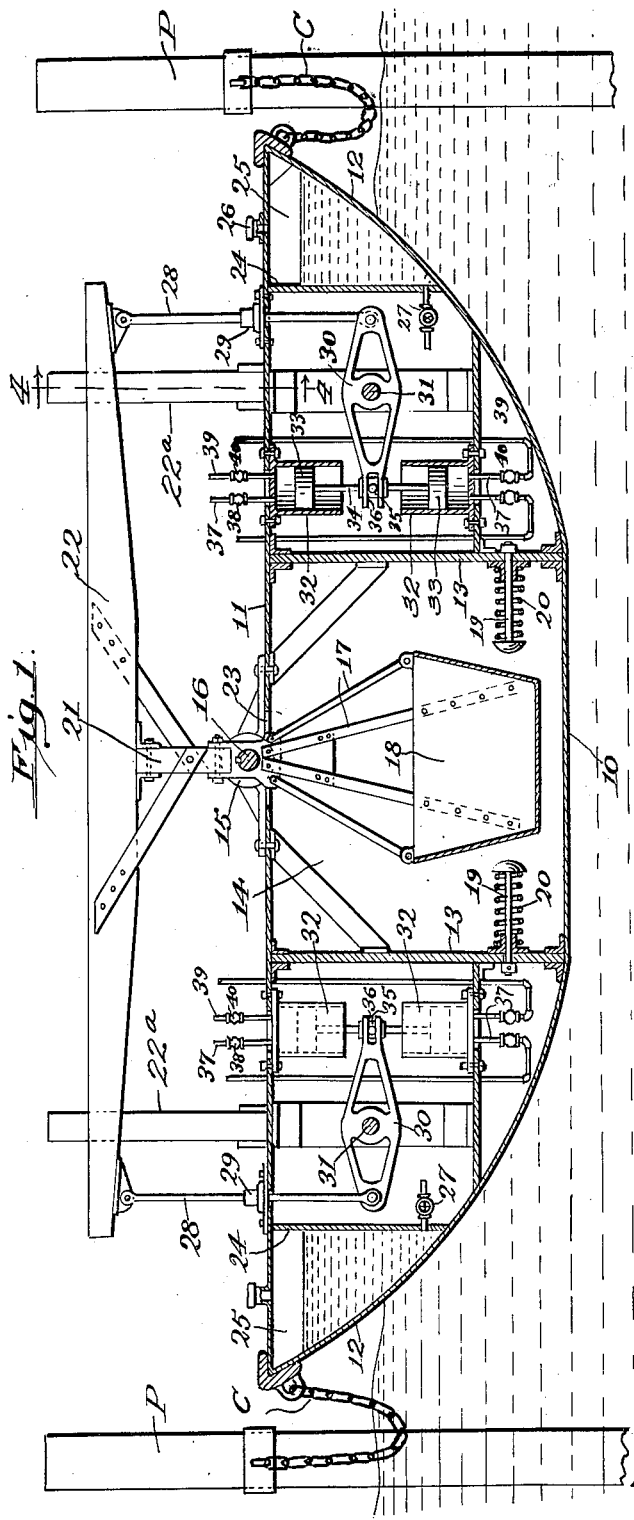
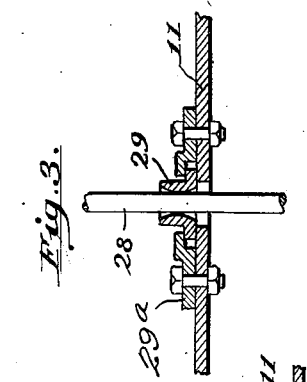
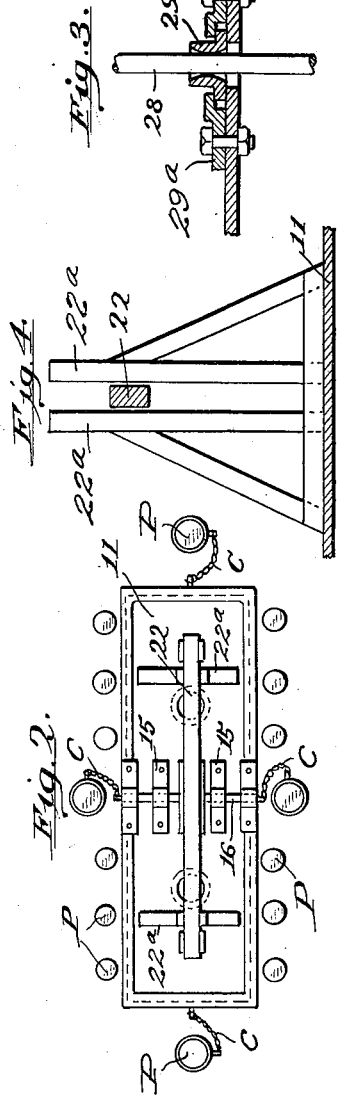
Inventor
THOMAS W. LOFTIS
By Martin O. Smith
Attorney Patented Aug. 3, 1937

2,089,064

UNITED STATES PATENT OFFICE 2,089,064

WAVE MOTOR

Thomas W. Loftis, Los Angeles, Calif.

Application November 2, 1935, Serial No. 47,989

6 Claims. (Cl. 230—68)

My invention relates generally to power producing apparatus and more particularly to that type of motor or apparatus utilized for deriving power from the motion of the waves of a natural body of water such as an ocean or large lake.

The principal objects of my invention are, to generally improve upon and simplify the construction of the existing forms of wave motors and to provide an apparatus of the character referred to that includes a large barge or boat hull-like member that rests on the surface of the water and which as a result of its rise and fall by virtue of the action of the waves, automatically imparts movement to mechanism used for compressing air, thereby very efficiently and economically producing power.

A further object of my invention is, to combine with a barge or boat hull-like member that rests on the water, a relatively heavy weight that swings on a horizontal axis after the manner of a pendulum and the tendency of which suspended weight to maintain its vertical position as the barge or boat hull tilts as a result of wave action, is effective in imparting movement to the air compressing means.

With the foregoing and other objects in view my invention consists in certain novel features of construction and arrangements of parts that will be hereinafter more fully described and claimed and illustrated in the accompanying drawing in which:

Fig. 1 is a vertical longitudinal section taken through the center of a wave motor constructed in accordance with my invention.

Fig. 2 is a plan view of the wave motor.

Fig. 3 is a detail sectional view of a universal bearing for a reciprocating rod used in the motor.

Fig. 4 is a vertical section taken on the line 4—4 of Fig. 1.

Referring by numerals to the accompanying drawing which illustrates a preferred embodiment of the invention, 10 designates the hull of a boat or barge and 11 the deck thereof. If desired a superstructure may be erected on the deck to house the parts of the motor positioned upon and above said deck; also for compressed air storage tanks or compressed air driven engines that are mounted on the deck.

Both ends of the hull 10 are curved or inclined upwardly to the deck 11, as designated by 12, in order to provide substantially inclined surfaces that are engaged by the incoming and receding waves. The hull thus constructed is suitably anchored, preferably by heavy chains C or cables, to the rows of piling P with one end pointing outwardly from the shoreline so that said outwardly presented end will be engaged by the incoming waves.

The chains or cables that anchor the ends of the hull are arranged so as to limit the vertical movement of said ends as the hull is rocked lengthwise and the chains or cables that anchor the sides of the hull to the piling are connected to said hull at points adjacent the longitudinal center thereof, thus in effect constituting a flexible axis for the hull as the same is tilted or rocked by the power of the waves.

Located within the hull between the intermediate portion and the upwardly curved end portions of the bottom, are vertically disposed partitions 13 that provide a large chamber or compartment 14 in the central portion of the hull.

Secured on top of the deck above the center of the compartment 14, are bearings 15 for a transversely disposed shaft 16.

Suspended from the central portion of this shaft by suitable hangers 17, is a large receptacle 18 that is positioned in the lower portion of chamber 14 and this receptacle may be filled with sand, water or the like, thus providing a pendulum like weight.

Arranged for sliding movement through the lower parts of the partitions 14, are horizontally disposed rods 19 and interposed between the heads of these rods and the partitions, are expansive coil springs 20. These rods and springs provide yielding buffers that are engaged by the lower portion of the suspended weight as the hull is rocked by the waves.

Suitably secured to the intermediate portion of shaft 16, is a short upright 21 and secured to the upper end thereof is a beam 22 that is disposed lengthwise of the hull a suitable distance above the deck thereof.

Secured to and projecting upwardly from the deck 11 near the ends of beam 22, are uprights 22ᵃ that function as guides and bearings for the ends of the beam so as to prevent any lateral movement thereof during the rocking movement of the hull or barge.

An opening 23 is formed in the deck for the accommodation of the upper portions of the hangers 17.

Located in the end portions of the hull are vertically disposed partitions or bulkheads 24 and the chambers 25 between these partitions and the ends of the hull are adapted to receive water to serve as ballast in rendering the swinging or tilting movements of the hull more stable.

These ballast chambers are provided with openings 26, through which water may be delivered to fill said chambers and the lower portions of said chambers are provided with valved outlets 27, through which the water ballast may be discharged.

Pivotally connected to the ends of beam 22, are the upper ends of connecting rods 28 that pass through universal bearings 29 mounted on the deck and pivotally connected to the lower ends of these rods below the deck, are the outer ends of short levers 30 that function as walking beams.

As illustrated in Fig. 3, the bearings 29 are retained on deck 11 by keepers 29ª that permit the bearings to slide freely for a limited distance in all directions and thus said bearings automatically position themselves to the variable movement of the rods 28 as the same are reciprocated.

The levers or beams 30 are fulcrumed on suitably supported horizontally disposed axes 31.

Suitably supported within the hull above and below the inner ends of the levers or beams 30, are cylinders 32 within which are mounted for operation, pistons 33. The members of each pair of pistons are connected by a rod 34 and secured to and projecting outwardly from the center of each rod are trunnions 35 that occupy slots 36 that are formed in the inner ends of the levers or beams 30.

Leading into the closed end of each cylinder 32, is an air inlet pipe 37 that is provided with an inwardly opening check valve 38 and leading from the closed end of each cylinder, is a compressed air outlet pipe 39, in which is located an outwardly opening check valve 40.

The compressed air pipes 39 extend to tanks located on the deck of the hull or they may be connected by suitable conduits to compressed air tanks located on land.

The hull or barge suitably anchored between the rows of piling P will be rocked longitudinally between forces exerted by incoming waves and also by the receding waves.

The container 18, by reason of the weight of its contents, tends to maintain a true vertical position and thus the hull or barge, in effect, rocks upon the axis formed by the shaft 16 and in so rocking the end portions of the barge alternately move toward and away from the ends of beam 22, which is held in a substantially horizontal position by the weight suspended from shaft 16. This relative movement between the end portions of the barge and beam swings the levers or walking beams 30 on their axes through connecting rods 28 and the swinging movement thus imparted to the beams will be correspondingly imparted to the rods 34 carrying the pistons 33.

The operation of the pistons 33 in the cylinders 32 function to draw air through the pipes 37 into the cylinders and then force said air under compression through the pipes 39 to the storage tanks, from whence it may be drawn and utilized for the operation of various machines, or for the generation of electric current.

The tilting or swinging movement of the hull with respect to the suspended weight is cushioned particularly at the ends of said swinging movement by the buffers that comprise the rods 19 and heavy expansion springs 20.

Thus it will be seen that I have provided a wave motor that is relatively simple in construction and which may be conveniently employed for economically converting the force and motion of waves into power and which latter may be employed for various useful purposes.

It will be understood that minor changes in the size, form, and construction of the various parts of my improved wave motor may be made and substituted for those herein shown and described without departing from the spirit of the invention, the scope of which is set forth in the appended claims.

I claim as my invention:

1. In a wave motor, the combination with a pair of spaced fixed uprights of a boat hull or barge, arranged between said uprights, flexible members connecting the sides of the barge with said uprights to provide a flexible axis on which the hull or barge rocks between said uprights, a transversely disposed shaft mounted for operation in bearings on the central portion of said boat hull or barge, a weight suspended from said shaft, a beam supported by said shaft above the deck of the hull, or barge, vertically disposed guides projecting upwardly from the boat hull for the end portions of said beam, air compressors located within the hull or barge, driving connections between the ends of said beam and said air compressors, said driving connections including vertically disposed reciprocating rods that pass through the deck of the boat hull and bearings mounted for sliding movement upon the deck for said reciprocating rods.

2. In a wave motor, the combination with a pair of spaced fixed uprights of a boat hull or barge, of a transversely disposed shaft mounted for operation in bearings on the central portion of said boat hull or barge, a weight suspended from said shaft, a beam supported by said shaft above the deck of the hull or barge, vertically disposed guides projecting upwardly from the boat hull for the end portions of said beam, air compressors located within the hull or barge, driving connections between the ends of said beam and said air compressors, said driving connections including vertically disposed reciprocating rods that pass through the deck of the boat hull, bearings mounted for sliding movement on the deck of the boat hull for said reciprocating rods, and buffers mounted within said hull or barge for engaging said weight as said hull or barge is tilted by the action of waves.

3. In a wave motor, the combination with a pair of fixed uprights, a hull, positioned between said fixed uprights, flexible members connecting the central portions of the sides of said hull with said uprights to provide a flexible axis on which the hull rocks between said uprights, a weight suspended from a transverse axis on the intermediate portion of said hull, a beam supported by said axis and extending longitudinally of said hull, guides projecting upwardly from the deck of said hull for the end portions of said beam, air compressors mounted on said hull and means mounted for operation on said hull and connected to the ends of said beam for operating said air compressors as said hull is tilted in relation to said beam and weight.

4. In a wave motor, the combination with a pair of spaced fixed uprights, of a hull arranged between said uprights, both ends of which gradually decrease in height from the intermediate portion of the hull towards its ends, flexible members connecting the intermediate portions of the sides of said hull with said fixed uprights to provide a flexible axis on which the hull rocks between said uprights, ballast chambers formed in both ends of said hull, a weight suspended from the upper central portion of said hull, a beam carried by the upper end of said suspended weight and extending longitudinally of the hull, guides projecting upwardly from the deck of the hull for the end portions of said beam, air compressors arranged within the hull, means connected to the ends of said beam for operating said air compressors as the hull is tilted lengthwise relative to said beam and suspended weight, said operating means including vertically disposed rods arranged for reciprocating movement through the deck of the hull, bearings mounted for sliding movement on the deck of the hull for said reciprocating rods.

5. In a wave motor, the combination with a pair of spaced fixed uprights, of a hull arranged between said uprights, both ends of which gradually decrease in height from the intermediate portion of the hull towards its ends, flexible members connecting the intermediate portions of the sides of said hull with said fixed uprights to provide a flexible axis on which the hull rocks between said uprights, ballast chambers formed in both ends of said hull, a weight suspended from the upper central portion of said hull, a beam carried by the upper end of said suspended weight and extending longitudinally of the hull, guides projecting upwardly from the deck of the hull for the end portions of said beam, air compressors arranged within the hull, means connected to the ends of said beam for operating said air compressors as the hull is tilted lengthwise relative to said beam and suspended weight, said operating means including reciprocating rods that pass through the deck of the hull, bearings mounted for sliding movement on the deck of the hull for said reciprocating rods and buffers carried by the lower portion of said hull for engaging the lower portion of said suspended weight as the hull is tilted.

6. In a wave motor, the combination with a pair of spaced uprights, of a boat hull or barge arranged between said uprights, flexible members connecting the intermediate portions of the sides of the hull or barge with said fixed uprights and constituting a flexible axis for the rocking or tilting movement of said hull or barge, a weight suspended within the intermediate portion of said hull or barge so as to tend to maintain a vertical position as the hull or barge is rocked by the waves, a beam supported by said weight above its axis and extending longitudinally of said hull or barge, guides projecting upwardly from the deck of the hull for the end portions of said beam, means connected to the ends of said beam for converting the tilting motion of the hull or barge into power, said motion converting means including reciprocating rods connected to the ends of said beam and passing through the deck of the hull and guides mounted for sliding movement on the deck of the hull for said reciprocating rods.

THOMAS W. LOFTIS.